United States Patent
Sipinski et al.

(10) Patent No.: US 8,051,282 B2
(45) Date of Patent: Nov. 1, 2011

(54) LOW VOLTAGE RESET DETERMINATION AND OPERATIONAL FLOW MODIFICATION FOR MICROPROCESSOR-CONTROLLED DEVICES

(75) Inventors: Gene Sipinski, Elgin, IL (US); Steve Han Ngok Cheng, Tai Po (HK); Gang Liu, Shenzhen (CN); Yuan Heng Liu, LongShi (CN)

(73) Assignee: S.C. Johnson & Son, Inc., Racine, WI (US)

(*) Notice: Subject to any disclaimer, the term of this patent is extended or adjusted under 35 U.S.C. 154(b) by 789 days.

(21) Appl. No.: 12/080,336

(22) Filed: Apr. 2, 2008

(65) Prior Publication Data

US 2009/0254770 A1   Oct. 8, 2009

(51) Int. Cl.
  *G06F 1/24* (2006.01)
(52) U.S. Cl. ....................................... 713/100
(58) Field of Classification Search ............ 713/323, 713/100
  See application file for complete search history.

(56) References Cited

U.S. PATENT DOCUMENTS

| | | | |
|---|---|---|---|
| 3,289,886 A | 12/1966 | Goldsholl et al. |
| 3,368,717 A | 2/1968 | Weber, III |
| 3,584,766 A | 6/1971 | Hart et al. |
| 3,589,563 A | 6/1971 | Carragan et al. |
| 3,615,041 A | 10/1971 | Bischoff |
| 3,643,836 A | 2/1972 | Hunt |
| 3,726,437 A | 4/1973 | Siegel |
| 3,841,525 A | 10/1974 | Siegel |
| 3,865,275 A | 2/1975 | De Nunzio |
| 4,011,927 A | 3/1977 | Smith |
| 4,063,664 A | 12/1977 | Meetze, Jr. |
| 4,638,175 A | 1/1987 | Bradford et al. |
| 4,675,538 A | 6/1987 | Epstein |
| 4,683,568 A | 7/1987 | Urban |
| 4,779,007 A | 10/1988 | Schlanger et al. |
| 4,830,791 A | 5/1989 | Muderlak et al. |
| 5,019,717 A | 5/1991 | McCurry et al. |
| 5,025,962 A | 6/1991 | Renfro |
| 5,055,822 A | 10/1991 | Campbell et al. |
| 5,386,576 A | 1/1995 | Chelard et al. |
| 5,487,502 A | 1/1996 | Liao |
| 5,519,261 A | 5/1996 | Stewart |
| 5,591,409 A | 1/1997 | Watkins |
| 5,676,283 A | 10/1997 | Wang |
| 5,694,583 A * | 12/1997 | Williams et al. ............ 703/24 |
| 5,962,930 A | 10/1999 | Cluff et al. |

(Continued)

FOREIGN PATENT DOCUMENTS

WO   WO02/086732 A   10/2002

OTHER PUBLICATIONS

PCT/US2009/002068 International Search and Written Opinion dated Sep. 17, 2009.

*Primary Examiner* — Thomas Lee
*Assistant Examiner* — Eric Chang

(57) ABSTRACT

A method of identifying a reset condition includes the steps of determining if a stored value is equal to a specified value, executing a first mode if the stored value is not equal to the specified value, and executing a second mode if the stored value is equal to the specified value. The second mode also includes the step of setting the stored value to a value different than the specified value.

12 Claims, 4 Drawing Sheets

U.S. PATENT DOCUMENTS

| | | |
|---|---|---|
| 6,264,548 B1 | 7/2001 | Payne, Jr. et al. |
| 6,371,450 B1 | 4/2002 | Davis et al. |
| 6,378,068 B1 | 4/2002 | Walker et al. |
| 6,390,453 B1 | 5/2002 | Frederickson et al. |
| 6,517,009 B2 | 2/2003 | Yahav |
| 6,540,155 B1 | 4/2003 | Yahav |
| 6,554,203 B2 | 4/2003 | Hess et al. |
| 6,698,616 B2 | 3/2004 | Hidle et al. |
| 6,722,529 B2 | 4/2004 | Ceppaluni et al. |
| 6,877,636 B2 | 4/2005 | Speckhart et al. |
| 7,062,677 B1 | 6/2006 | Chigurupati |
| 7,215,084 B1 | 5/2007 | Sharrah et al. |
| 2004/0030881 A1 | 2/2004 | Harrington |
| 2005/0081079 A1* | 4/2005 | Cheston et al. .......... 714/2 |

* cited by examiner

LOW VOLTAGE RESET DETERMINATION AND OPERATIONAL FLOW MODIFICATION FOR MICROPROCESSOR-CONTROLLED DEVICES

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present disclosure relates generally to microprocessor-controlled devices, and more particularly, to providing different modes of operation for the microprocessor-controlled devices in response to the detection of specified conditions.

2. Description of the Background of the Invention

Microprocessors execute programming to control a wide range of electrical and electromechanical devices, from personal computers to automatic dispensers for volatile substances. In such a microprocessor-controlled device, a power source, such as a battery or an electrical outlet, supplies power to the microprocessor and other components of the device. Proper operation of the device is sensitive to fluctuations in the power level supplied by the power source. For example, if the power drops below a threshold operating level of the microprocessor, then the programming executed by the microprocessor to control the device is interrupted and reset. A drop in power can be caused by a variety of intentional or unexpected conditions. For example, a power drop may occur when the device is intentionally turned off to conserve power, when the power source becomes depleted over time, or when a momentary drop in power, i.e., a brownout, occurs because of fluctuations in the power source or because of a resultant increase in current draw caused by the device performing certain functions. In some applications, it may be desirable or even necessary to be able to identify the condition that caused the power drop so that the programming executed by the microprocessor can be modified to resume proper operation of the device when the power is restored above the threshold operating level. Therefore, a need exists for an effective and reliable way to identify a condition that has caused a reset and to resume proper operation of the device based on the identification of the condition. It is also desirable that an implementation of a solution to this problem need only a minimal amount of additional components, such as, e.g., control circuitry, memory, and power supplies.

SUMMARY OF THE INVENTION

According to one embodiment, a method of identifying a reset condition includes the steps of determining if a stored value is equal to a specified value, executing a first mode if the stored value is not equal to the specified value, and executing a second mode if the stored value is equal to the specified value. The second mode also includes the step of setting the stored value to a value different than the specified value.

According to another embodiment, a system for identifying a reset condition includes a microprocessor. The microprocessor includes programming to execute a first mode if a value stored in a memory is not equal to a specified value and to execute a second mode if the value is equal to the specified value. The second mode further includes the step of setting the value stored in the memory to a value different than the specified value.

According to a further embodiment, a dispensing apparatus includes first means for distinguishing between a power-on reset and a low voltage reset, second means for performing a spray operation during a power-on reset, and third means for bypassing the spray operation during a low voltage reset.

Other aspects and advantages of the present invention will become apparent upon consideration of the following detailed description.

DETAILED DESCRIPTION OF THE DRAWINGS

Figure 1:
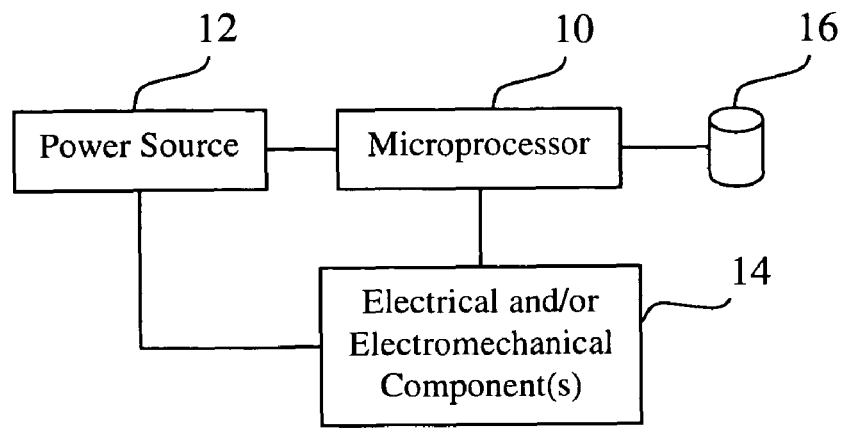
FIG. 1 is a block diagram of a first embodiment of a microprocessor-controlled device.

The block diagram of FIG. 1 includes a microprocessor 10, a power source 12, and one or more components 14, such as electrical circuitry and/or electromechanical devices. The block diagram can be implemented as a control system in a wide range of devices and systems, e.g., a personal computer, an automobile, a lighting system, heating and air conditioning systems, automatic dispensers for aerosol containers, and any other suitable implementation known to one of ordinary skill in the art. The microprocessor 10 and the components 14 are coupled to and receive power from the power source 12. Further, the microprocessor 10 is coupled to the component(s) 14 and executes programming to control the operation thereof. In one embodiment, the microprocessor 10 may be a SH6610C based single-chip 4-bit micro-controller, such as those manufactured by Sino Wealth Microelectronics Corp. Ltd., of 3301, 33/F, Skyline Tower, 39 Wang Kwong Road, Kowloon Bay, Hong Kong. However, it is contemplated that any type of microcontroller known to those of skill in the art may be used with the present embodiments. FIG. 1 also illustrates a memory 16 coupled to the microprocessor 10. In other embodiments, the microprocessor 10 includes a built-in memory and other components, such as, for example, timers and clocks, analog/digital converters, input/output interfaces, logic elements, etc., as would be apparent to one skilled in the art.

Figure 2:
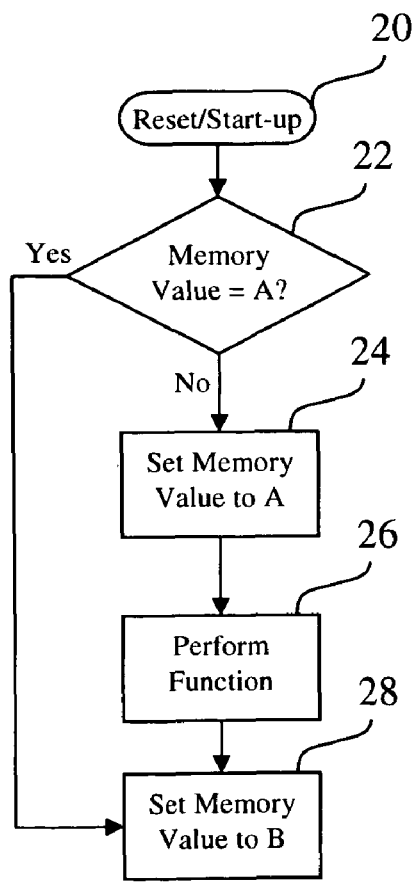
FIG. 2 is a flowchart that illustrates programming that may be executed by the device of FIG. 1.

One embodiment of the programming executed by the microprocessor 10 is illustrated in FIG. 2, which initiates at a reset/start-up block 20. After the block 20, control passes to a decision block 22 that determines whether a specified memory location, e.g., a location in the memory 16, stores a value equal to a specified value "A." The specified value "A" can be any value and size and can be stored in any format, as would be apparent to one of ordinary skill in the art. If the decision block 22 determines that the memory value is not equal to "A," then control passes to a block 24 in a first mode of operation and the memory location is set to the value "A." Next, control passes to a block 26 that performs a function such as a start-up sequence, an initialization sequence, or some other intended function. Following the block 26, control passes to a block 28 and the memory location is set to a specified value "B." In the present embodiment, the specified value "B" is not equal to "A" but otherwise can be any value and size and can be stored in any format.

Referring again to the decision block 22, if the memory location does store a value equal to "A," then control bypasses the blocks 24 and 26 and passes directly to the block 28 in a second mode of operation. At block 28, the memory location is subsequently set to the value "B." In the present scenario, the programming is responding to a low-voltage reset caused during an earlier operation sequence in the block 26. For example, the performance of the function in the block 26 may cause an increased current draw from the power source, such as when an electromechanical component is energized, that results in a temporary drop in power supplied to the microprocessor below a threshold operating level, i.e., a brownout. Such a brownout causes the programming of FIG. 2 to reset to the block 20, i.e., a low voltage reset, prior to passing control to block 28. In the present scenario, the low voltage reset does not allow the memory value to erase or reset to a value other than "A." The memory value "A" is retained because a residual amount of power is still being supplied to the microprocessor 10 by the power source 12, which is sufficient for the microprocessor 10 to retain the value stored in the memory 16. Consequently, when control passes to the decision block 22 after the low voltage reset, the memory value is equal to "A" and control will bypass the blocks 24 and 26 that caused the reset and pass directly to the block 28 where the memory location is set to the value "B." However, if the program has been intentionally reset, then the memory value is either erased or set to some random value other than "A." The programming of FIG. 2 provides an efficient and reliable process to identify a specified reset condition and to modify the operation of the device in response to the identification.

Figure 3:
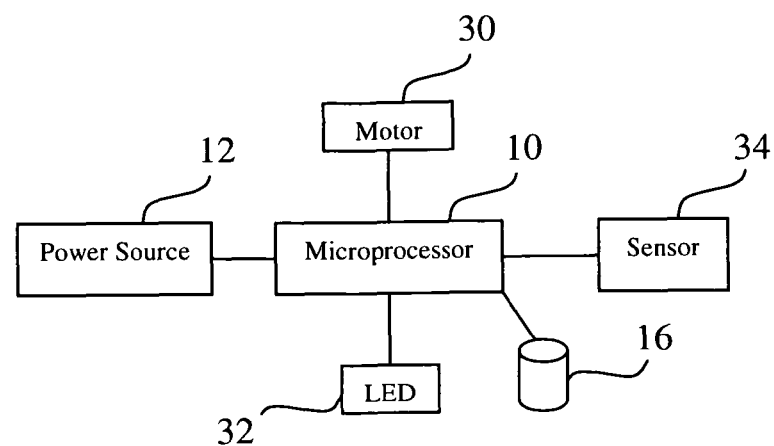
FIG. 3 is block diagram of a second embodiment of a microprocessor-controlled device.
Figure 4:
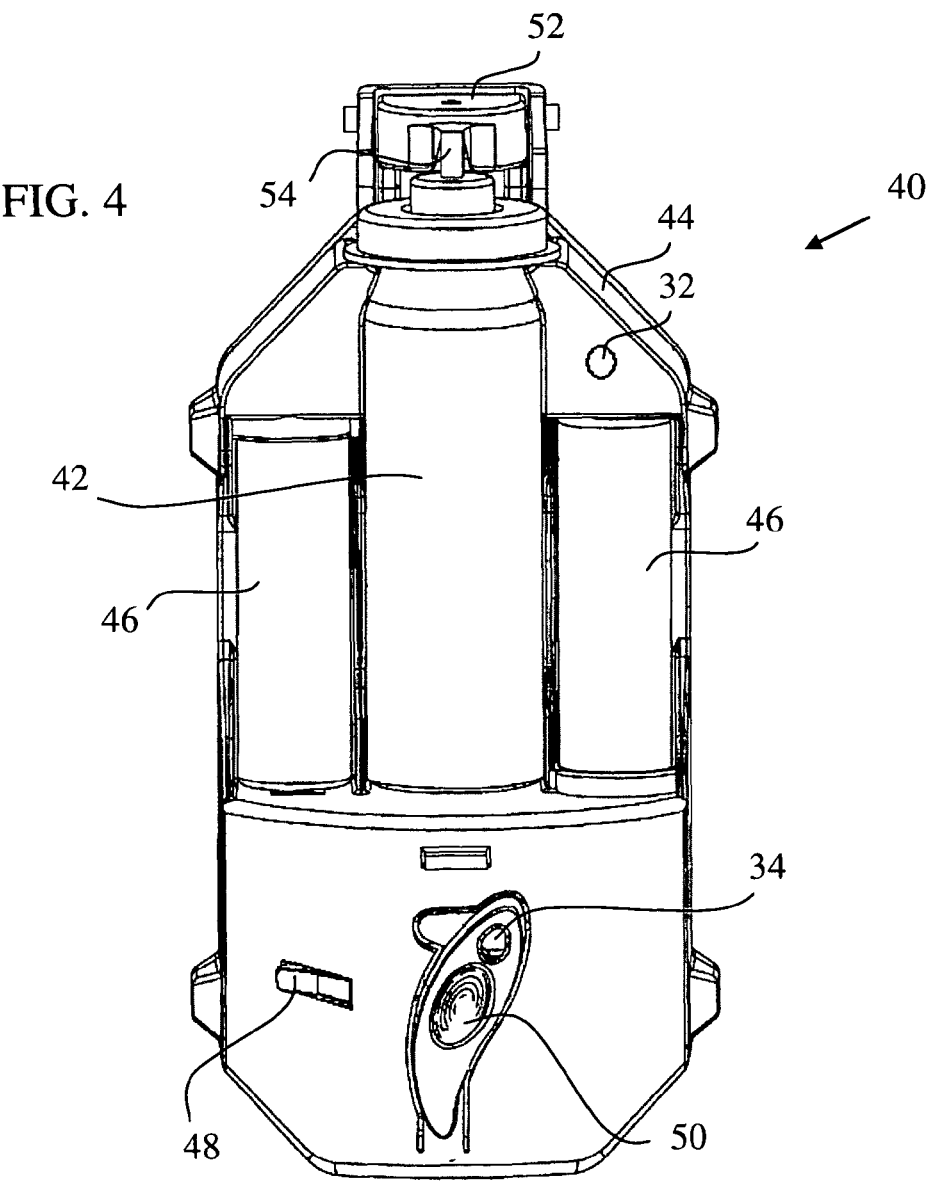
FIG. 4 is an isometric view of a device according to the second embodiment of FIG. 3.

The block diagram of FIG. 3 is similar to the block diagram of FIG. 1 in that both include the microprocessor 10, the power source 12, and the memory 16. FIG. 3 further includes components such as a motor 30, a light emitting diode ("LED") 32, and a sensor 34. FIG. 4 illustrates an embodiment of the block diagram of FIG. 3 implemented as a device 40 for dispensing the contents of an aerosol container 42. The device 40 may be one of the devices described in U.S. patent application Ser. No. 11/725,402, which is incorporated herein by reference in its entirety. The device 40 includes a housing 44 that is adapted to receive the aerosol container 42 and batteries 46. In addition, the device 40 includes a selector switch 48, a pushbutton 50, and an actuator arm 52. The device 40 also includes circuitry, the microprocessor 10, the motor 30, the LED 32, and the sensor 34, which are provided within the housing 44 and shown generally in FIG. 3.

The microprocessor 10 controls the motor 30 during a spray operation to actuate the actuator arm 52, which depresses a valve stem 54 of the aerosol container 42 to dispense the contents therefrom. The microprocessor 10 includes programming to initiate a spray operation in response to a signal generated by the pushbutton 50, a timer, or the sensor 34. The timer can be implemented in the microprocessor 10 or as a separate component. For example, in one embodiment, the microprocessor 10 includes programming to control the device 40 in a timed automatic actuation mode, wherein the device 40 performs spray operations at specified time intervals, e.g., every 30 minutes. Alternatively, or in conjunction with the first embodiment, the microprocessor 10 is programmed to perform a spray operation in response to a signal from the sensor 34 and/or the pushbutton 50. Indeed, any of the operational methodologies described in U.S. patent application Ser. No. 11/725,402 or known to one of skill in the art are contemplated to be used in conjunction with the device 40.

For purposes of illustrating the low voltage reset determination and operational flow modification functionality of the microprocessor 10, one particular embodiment will be described with particularity. Turning again to FIG. 4, in the present embodiment the selector switch 48 is used to turn the device 40 on and off and to select between various operating modes, which include a timed mode, a sensing mode, and a combined timed and sensing mode. The LED 32 flashes to indicate that the device 40 is on and operating normally and/or to provide a warning that the device 40 is about to perform a spray operation. The pushbutton 50 is provided for manual actuation of the aerosol container 42, wherein the pushbutton 50 may be depressed by a user to cause a spraying operation at any time, except when the device 40 is off. The pushbutton 50 allows the user to manually override the automatic actuation of the device 40. The sensor 34 in the present embodiment is a photocell light sensor, which may be used to detect motion. However, any other type of motion detector may be utilized, e.g., a passive infrared or pyroelectric motion sensor, an infrared reflective motion sensor, an ultrasonic motion sensor, or a radar or microwave radio motion sensor. Further, the sensor 34 can be replaced or used in combination with any other type of known sensor, e.g., a heat sensor or an odor sensor.

Figure 5:
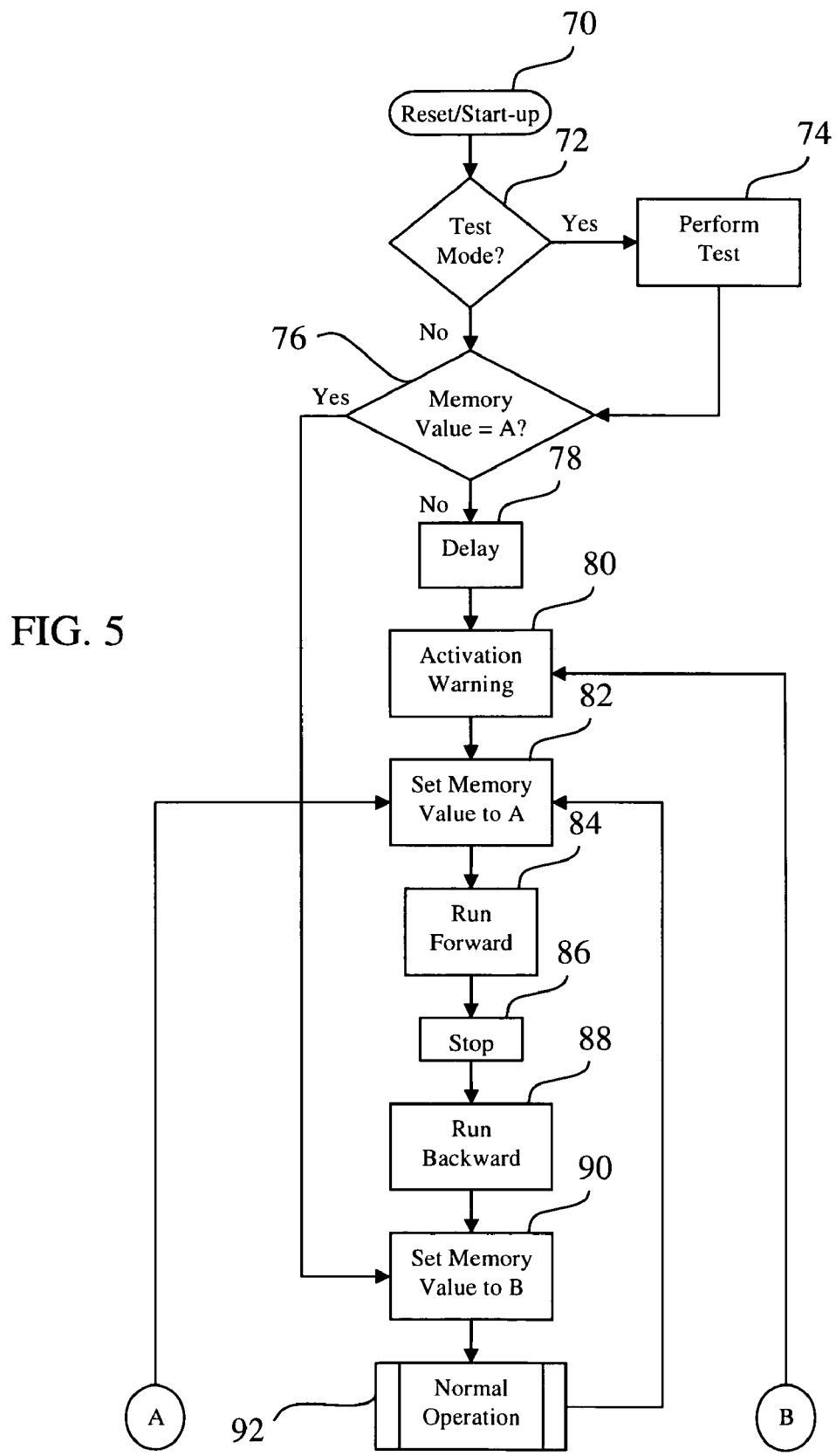
FIG. 5 is a flowchart that illustrates programming that may be executed by the device of FIG. 4.

Referring to FIG. 5, the programming implemented by the microprocessor 10 to control the device 40 initiates at a reset/start-up block 70 when the selector switch 48 is toggled into an on position or new batteries 46 are inserted into the device 40, i.e., a power-on reset. Thereafter, control passes to a decision block 72, which determines whether a test mode is to be performed. If the test mode is to be performed, then the test mode is performed at a block 74. In one embodiment, the test mode is performed at a manufacturing facility to ensure the proper operation of the device before a consumer uses the device. For example, the decision block 72 can determine that a test mode is to be performed when batteries 46 are inserted into the device 40 and the pushbutton 50 is depressed for five seconds. Thereafter, various tests can be performed during the block 74, such as testing the motor 30, the LED 32, and the sensor 34. Other tests can also be performed as would be apparent to one of ordinary skill in the art.

Control passes to a decision block 76 after the test mode is performed at the block 74 or if the decision block 72 determines that a test mode is not to be performed. The decision block 76 determines whether a specified memory location stores a value equal to a specified value "A." If the memory value is not equal to "A," then control passes to a delay block 78 and control pauses for a predetermined period of time, e.g., about 10-30 seconds. Following the delay block 78, control passes to a block 80 and a warning or notice is issued that an activation sequence is imminent. In the present embodiment, the warning is a flashing or flickering of the LED 32. However, in other embodiments, the warning can be any combination of a visual, audible, tactile, olfactory, or any other warning that would be apparent to one of ordinary skill in the art. After the block 80, control passes to a block 82 and the memory location is set to the value "A."

Next, the programming performs an activation sequence. In the present embodiment, the activation sequence is a spray operation that includes blocks 84, 86, and 88. More specifically, the spray operation begins at the block 84 where the motor 30 is energized to move the actuator arm 52 downwardly to depress the valve stem 54 of the aerosol container 42 into an open position. The motor 30 is deenergized in block 86. Thereafter, the motor 30 is energized to move the actuator arm 52 in the opposite direction in block 88 to assist the valve stem 54 in moving to a closed and non-depressed position. In one embodiment, the motor 30 is energized during the block 84 for about 1 second, the motor 30 is deenergized during the block 86 for about 150 milliseconds, and the motor 30 is energized during the block 88 for about 400 milliseconds. Modifications to the activation sequence of the present embodiment can include any sequence of the same or different steps, as would be apparent to one of ordinary skill in the art. Following the activation sequence, control passes to a block 90, during which the memory location is set to a specified value "B," which is different than the value "A" as noted above.

Referring back to the decision block 76, if the specified memory location stores a value equal to the specified value "A," then control bypasses the blocks 78-88 and passes directly to the block 90 to set the memory location to the value "B." After the block 90, control passes to a block 92 and programming enters a normal operational procedure or mode, wherein the programming executes manual or automatic activation sequences, as described in detail below.

In the present embodiment, the programming performs a startup or power-on reset operation that includes execution of the blocks 84-88 to perform an activation sequence when the selector switch 48 is toggled into an on position or new batteries are inserted into the device. The programming also performs activation sequences in accordance with the normal operation mode. During both the reset/start-up and normal operating modes, an increase in current draw occurs when the motor 30 is energized. This increased current draw results in a voltage drop across the batteries 46 and the associated circuitry powered by the batteries 46, e.g., the microprocessor 10. The increased current draw and additional voltage drop are temporary, i.e., such effects cease after the activation sequence is completed or interrupted.

During the normal operational mode, the batteries 46 provide a sufficient voltage level to the microprocessor 10 that is higher than a threshold operating level for the microprocessor 10 despite the additional voltage drop during the activation sequence. As the battery voltage becomes depleted, the temporary voltage drop will cause the voltage level supplied to the microprocessor 10 to fall below the threshold operating level. When the voltage level supplied to the microprocessor 10 falls below the threshold operating level during an activation sequence, the device 40 enters a brownout state and causes a low voltage reset of the device 40 (see block 70 of FIG. 5) and a re-running of the reset/start-up methodology described above. However, prior to the resetting of the device 40 a fluid may be dispensed during the interrupted activation sequence.

Upon the resetting of the device 40 the programming would normally cause yet another activation sequence to occur (see FIGS. 78-88), which would thereafter result in another brownout and resetting of the device 40. However, the programming of the present device 40 is capable of identifying a reset caused by a brownout, i.e., a low voltage reset, at the decision block 76 when the value stored in the memory location is determined to be equal to "A," thereby allowing the device 40 to bypass an undesired additional reset activation sequence. Specifically, in the present embodiment the programming sets the memory location to the value "A" at the block 82 when the device 40 is initially turned on. As noted above, a subsequent activation sequence and brownout cause the device 40 to reset during or immediately after the activation sequence, which passes control back to block 70 before control passes to block 90 and the memory value is reset to the value "B." As noted above, the memory 16 retains the value stored therein during a reset condition but not a power-on condition. Consequently, because the memory location is equal to the value "A," control bypasses yet another activation sequence and immediately passes to the block 90. If the memory location is not equal to the value "A," then the reset was not caused by a brownout or low voltage condition and the programming performs the startup operation that includes the activation sequence. In this manner, the programming illustrated in FIG. 5 can distinguish between a power-on reset and a low voltage reset and modify the operation of the device 40 accordingly.

In the present embodiment, the two fully charged batteries 46 provide about 3.2 volts to the microprocessor 10 and the other electrical or electromechanical components 14 of the device 40. The threshold operating level of the microprocessor 10 is about 1.8 volts. The activation sequence causes about a 0.5-0.6 voltage drop across the batteries 46. Consequently, fully charged batteries 46 provide a sufficient voltage level to the microprocessor 10 even with the voltage drop caused by the activation sequence. However, when the batteries 46 become depleted to within a range of about a 2.2-2.3 volts the additional voltage drop during the activation sequence may temporarily lower the voltage supplied to the microprocessor 10 to around 1.7 volts, thereby causing the microprocessor 10 to reset because of a low voltage condition.

Figure 6:
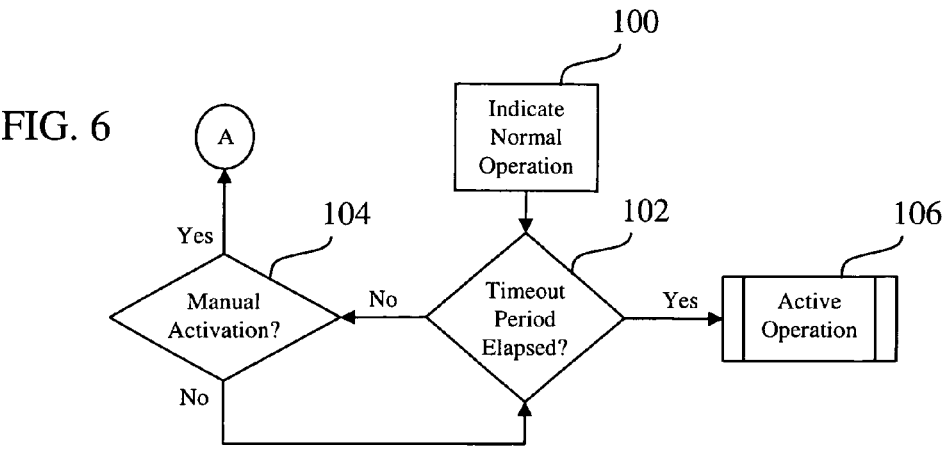
FIG. 6 is a flowchart that illustrates programming that may be executed during a normal operational mode of the device of FIG. 4.

FIG. 6 illustrates the normal operational mode of the present embodiment, which begins at a block 100. At the block 100 the device 40 turns on the LED 32 to provide an indication that the device 40 is in the normal operational mode. Following the block 100, control passes to a decision block 102 and the programming implements a timeout mode. The timeout mode can last for any period of time, e.g., ten seconds, thirty minutes, one hour, etc. Control remains in the timeout mode without performing an activation sequence unless a decision block 104 determines that the pushbutton 50 has been depressed or until the block 102 determines that the period of time has lapsed. If the pushbutton 50 has been depressed, control loops back to the block 82 where the memory location is set to the value "A" and the activation sequence is performed, as described above. Thereafter, the memory value is set to "B," and the workflow returns to the timeout mode in block 102. If the period of time has lapsed without the pushbutton 50 being depressed, then control passes to a block 106, wherein the programming implements a third or active operational procedure or mode.

Figure 7:
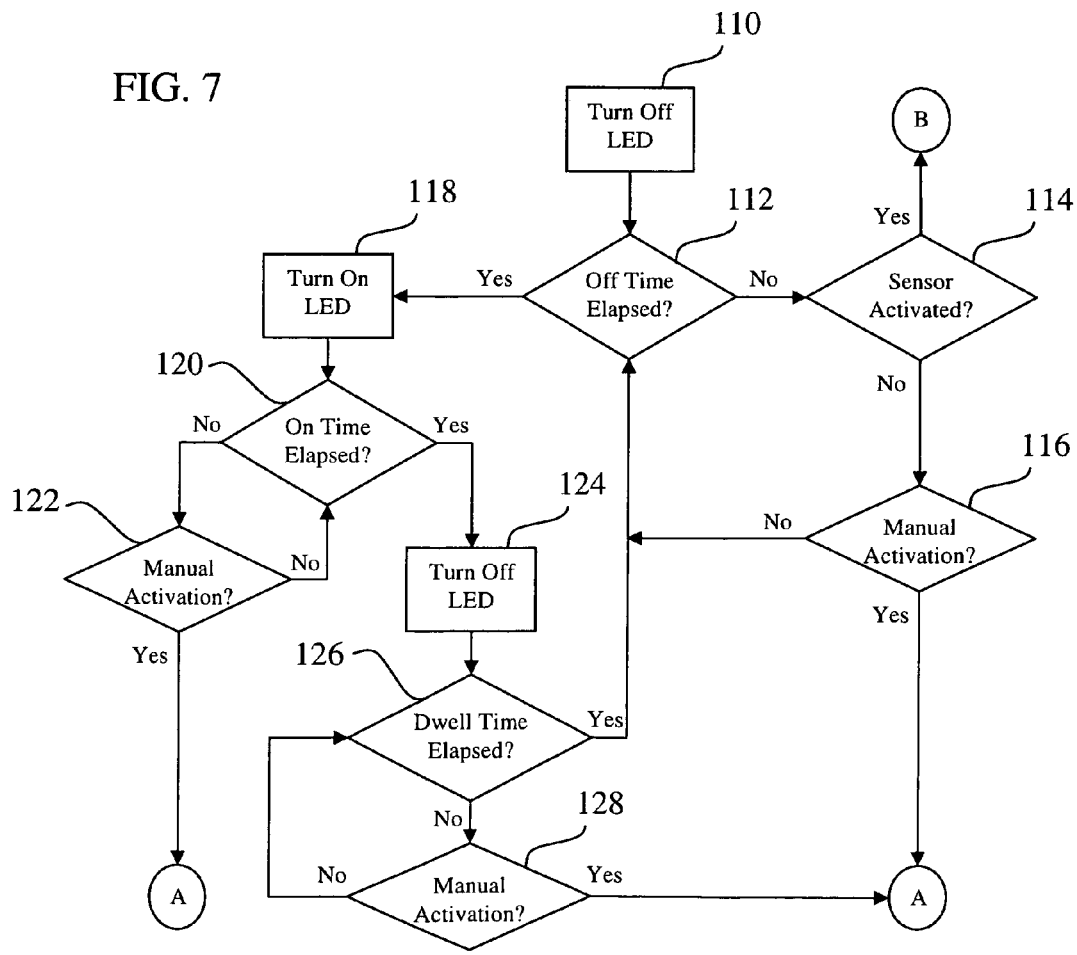
FIG. 7 is a flowchart that illustrates programming that may be executed during an active operational mode of the device of FIG. 4.

Turning to FIG. 7, the active operational mode of the device 40 begins at a block 110, which causes the LED 32 to be turned off. Thereafter, control passes to a decision block 112 to determine whether an "off-time" interval of the LED 32 has lapsed. In the present embodiment the "off-time" interval is preferably about 4.5 seconds. If the "off-time" has not lapsed control passes to another decision block 114, which determines if the sensor 34 has detected the occurrence of a specified event. If it is determined that the sensor 34 has detected the specified event, e.g., the entrance of a person into a room, control passes to the block 80 of FIG. 5 and the programming performs an activation sequence, as described above. However, if the sensor 34 does not detect the specified event, control passes to a decision block 116 to determine whether an electronic signal has been generated by the depression of the pushbutton 50. Control passes to the block 82 of FIG. 5 to perform an activation sequence if the pushbutton 50 has been depressed or returns to the block 112 if the pushbutton 50 has not been depressed.

Referring again to block 112, upon the lapsing of the "off-time" interval control passes to a block 118. Block 118 causes the LED 32 to be turned on and passes control to a decision block 120. The decision block 120 determines whether an LED "on-time" interval has lapsed. In the present embodiment the "on-time" interval is preferably about 150 ms. If the "on-time" interval has not lapsed control passes to a decision block 122 to determine whether the pushbutton 50 has been depressed. Control passes to the block 82 of FIG. 5 to perform an activation sequence if the pushbutton 50 has been depressed or returns to the block 120 if the pushbutton has not been depressed. Upon expiration of the "on-time" interval control passes to a block 124, whereupon the LED 32 is turned off. Thereafter, control passes to a decision block 126, which determines whether a "dwell time" interval has lapsed. In the present embodiment the "dwell time" interval is preferably about 450 ms. If the "dwell time" interval has not lapsed control passes to a decision block 128 to determine whether the pushbutton 50 has been depressed. Control passes to the block 82 to perform an activation sequence if the pushbutton 50 has been depressed or returns to the block 126 if the pushbutton has not been depressed. Upon expiration of the "dwell time" interval control passes back to the block 112 and the active operational mode repeats itself in a similar manner as described above.

The active operational mode causes the LED 32 to be alternatively turned on and off, i.e., to flicker. The flickering LED 32 allows a user to determine that the device 40 is in the active operational mode. Alternatively, any lighting methodology or other indication means may be provided to indicate any of the operating modes of the device 40. Further, an additional benefit of the flickering LED 32 is that if the sensor 34 is a light sensor, deactivation of the LED 32 during an active sensory mode precludes the sensor 34 from being falsely triggered by the LED 32.

INDUSTRIAL APPLICABILITY

The microprocessor-controlled devices described herein advantageously allow for the microprocessor to identify a reset condition and to modify the programming executed by the microprocessor in accordance with the identification. More particularly, the programming can distinguish between a power-on reset and a low voltage reset and bypass an undesired activation sequence if one had just been performed.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A method of identifying a reset condition, comprising the steps of:
    determining if a stored value is equal to a specified value;
    executing a first mode if the stored value is not equal to the specified value, wherein the first mode includes the steps of automatically setting the stored value to the specified value, performing an activation sequence, and setting the stored value to a value different than the specified value after performing the activation sequence; and
    executing a second mode if the stored value is equal to the specified value, wherein the second mode bypasses the first mode,
    wherein the second mode includes setting the stored value to a value different than the specified value.

2. The method of claim 1, wherein the activation sequence is a spray operation.

3. The method of claim 1, further comprising executing a third mode after the first or second modes, wherein the third mode includes the step of performing an activation sequence.

4. The method of claim 3, wherein the activation sequence in the third mode is performed in response to a signal from a sensor.

5. The method of claim 4, wherein executing the third mode further includes the step of providing an indication of the third mode.

6. The method of claim 5, wherein the signal from the sensor is ignored during the step of providing an indication of the third mode to avoid a false triggering of the sensor.

7. The method of claim 6, wherein the indication includes turning an LED on.

8. The method of claim 4, wherein the activation sequence in the third mode is performed in response to a signal from a pushbutton.

9. The method of claim 1, further comprising identifying a power-on reset if the stored value is not equal to the specified value and a low voltage reset if the stored value is equal to the specified value.

10. The method of claim 9, wherein the low voltage reset is caused during a step of performing an activation sequence.

11. A system for identifying a reset condition, comprising:
    a microprocessor,
    wherein the microprocessor includes programming to execute a first mode if a value stored in a memory is not equal to a specified value and to execute a second mode if the value is equal to the specified value,
    wherein the programming to execute the first mode includes a first command to automatically set the value stored in memory to the specified value, a second command to perform an activation sequence, and a third command to automatically set the value stored in memory to a value different than the specified value;
    and wherein the programming to execute the second mode includes setting the value stored in the memory to a value different than the specified value and bypassing the programming to execute the first mode.

12. The system of claim 11, wherein the first mode corresponds to a power-on reset and the second mode corresponds to a low voltage reset.

* * * * *